United States Patent [19]

Prater et al.

[11] 4,149,880

[45] Apr. 17, 1979

[54] RECOVERY OF COPPER FROM ARSENIC CONTAINING METALLURGICAL WASTE MATERIALS

[75] Inventors: John D. Prater, Salt Lake City; Barry A. Wells, Centerville, both of Utah

[73] Assignee: Kennecott Copper Corporation, New York, N.Y.

[21] Appl. No.: 925,969

[22] Filed: Jul. 19, 1978

[51] Int. Cl.$^2$ ............................................ C22B 15/12
[52] U.S. Cl. ........................................ 75/117; 75/99; 75/109; 75/120; 75/121; 75/101 R; 423/41
[58] Field of Search .................... 423/41; 75/117, 109, 75/101 R, 99, 120, 121

[56] References Cited

U.S. PATENT DOCUMENTS

| | | | |
|---|---|---|---|
| 2,686,114 | 8/1954 | McGauley et al. | 75/117 X |
| 3,330,650 | 7/1967 | Zimmerley et al. | 75/104 |
| 3,455,677 | 7/1969 | Litz | 75/117 X |
| 3,880,650 | 4/1975 | Pemsler | 75/117 X |
| 3,902,896 | 9/1975 | Borbely et al. | 75/109 |
| 3,929,599 | 12/1975 | Johnson et al. | 75/117 X |
| 4,026,988 | 5/1977 | Wells et al. | 75/101 BE |
| 4,071,357 | 1/1978 | Peters | 423/105 X |
| 4,071,421 | 1/1978 | Masters et al. | 75/117 X |
| 4,076,605 | 2/1978 | Bilson | 77/99 X |

Primary Examiner—G. Ozaki
Attorney, Agent, or Firm—Mallinckrodt & Mallinckrodt

[57] ABSTRACT

Highly toxic metallurgical waste materials from copper smelting and/or refining operations are processed on a cyclic basis for recovering copper values therefrom while protecting the environment from contamination. The waste materials, usually smelter flue dust and/or refinery sludge containing copper values and principally arsenic, bismuth, lead, antimony, and cadmium, as toxic values, with or without added sulfuric acid, are reacted in an autoclave at an overpressure atmosphere of $O_2$. The resulting solution, pregnant with copper and still containing a significant amount of arsenic, i.e. from about 0.5 to about 2.0 grams per liter, is subjected to copper cementation on metallic iron to recover copper and to provide iron values in the solution while substantially eliminating residual toxic constituents, surprisingly without the evolution of arsine gas. The copper-barren but iron-containing solution is then recycled to the leaching step. The cement copper precipitate is smelted along with copper ore concentrates, while the solid residue from the leaching step is discharged to a tailings pond or the like as an environmentally safe, insoluble residue.

9 Claims, 1 Drawing Figure

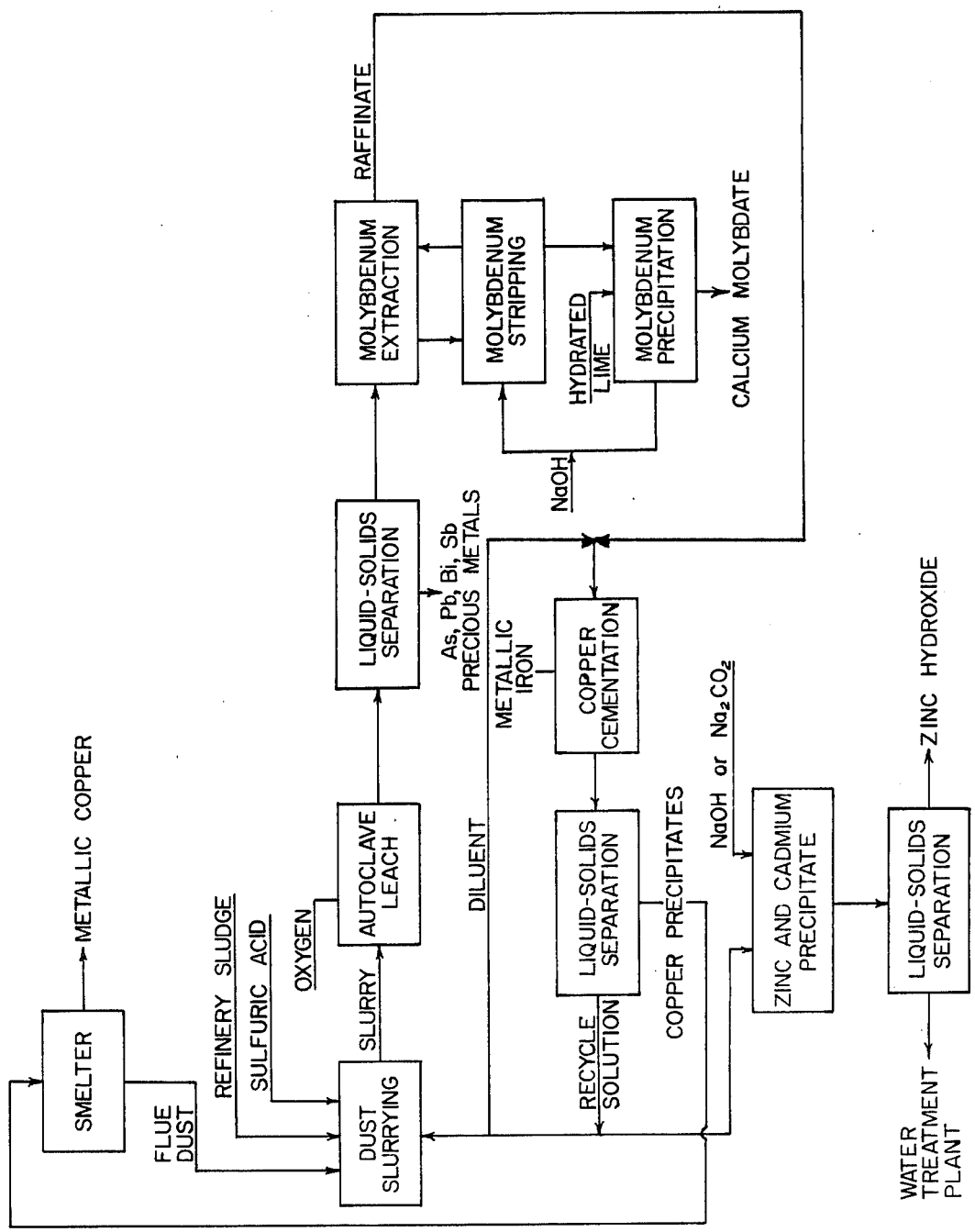

ABSTRACT/PATENT CONTENT

RECOVERY OF COPPER FROM ARSENIC CONTAINING METALLURGICAL WASTE MATERIALS

BACKGROUND OF THE INVENTION

1. Field:

The invention is in the field of treatment of smelter flue dusts, refinery sludges, and like metallurgical waste materials containing highly toxic ingredients, for the recovery of copper values.

2. Objective:

In the making of the invention it was a major objective to protect the environment from highly toxic constituents of such waste materials, while recovering copper values therefrom in a more economical manner than theretofore.

3. State of the Art:

It has been proposed heretofore (U.S. Pat. No. 2,686,114) to recover various metal values from ore concentrates high in arsenic by leaching such ore concentrates at elevated temperature (250°–650° F.) and pressure (100–560 psi.) According to the examples given in that patent, use of the specified higher temperatures and pressures results in removal of essentially all of the arsenic values from the leach solution during the leach, resulting in a substantially arsenic-free solution which may be treated in a variety of ways, including cementation techniques, for the recovery of desired metal values, such as copper. The important factor is that there be sufficient iron or alkaline earth metal values present during the leach to render essentially all of the arsenic values insoluble during the leach. This requires the addition of iron or alkaline earth metal values to the leach feed material when the total available therein is less than or even merely the equivalent of the arsenic values present therein.

Unless essentially all of the arsenic values are removed from the solution, common experience in the art indicates that the application of cementation procedures to the resulting pregnant leach solution will be accompanied by the undesirable evolution of arsine gas and that such cementation procedures should be avoided in the absence of essentially complete removal of arsenic values from the leach feed material.

SUMMARY OF THE INVENTION

In achieving the aforesaid major objective of the invention, we have found unexpectedly that during the cementation of copper with metallic iron from leach solutions derived in the manner of the aforesaid U.S. Pat. No. 2,686,114, but still containing significant amounts of arsenic values, i.e. from about 0.5 to about 2.0 grams per liter, arsine gas is not evolved during the cementation procedure, which enables the leaching to be carried out at lower and more economical temperature and pressure and without the extra step of adding iron or alkaline earth metal values to the leach feed material. Accordingly, the present disclosure enables the art to avoid the costly requirements insisted upon by said patent, while attaining equivalent results.

THE DRAWING

The accompanying drawing constitutes a flow sheet representing the best mode presently contemplated of applying the process of the invention to the recovery of copper and other desired metal values from highly toxic smelter flue dusts and refinery sludges in a cyclic, environmentally protective procedure.

DETAILED DESCRIPTION OF THE ILLUSTRATED EMBODIMENT

In the illustrated application of the invention, highly toxic smelter flue dust, formed incidentally to the smelting of flotation concentrates of a low grade, copper prophyry ore, such as that obtained from the Bingham Canyon open pit mine of the Utah Copper Division of Kennecott Copper Corporation, is treated on a cyclic basis for the recovery of copper and other desired values contained therein while protecting the environment from highly toxic constituents thereof, chiefly arsenic but also including bismuth, lead, antimony, and cadmium as principal potential contaminants of the environment. Refinery sludge may also be fed into the system, as indicated, or may be similarly treated independently of smelter flue dust if for some reason it becomes desirable to do so.

A typical flue dust will analyze, by weight:

| | | |
|---|---|---|
| 13.6% copper | 13.5% arsenic | 0.2% antimony |
| 0.9% molybdenum | 1.71% bismuth | 0.2% cadmium |
| 2.1% zinc | 14.7% lead | 3.8% iron |

The flue dust and refinery sludge if desired are formed into a slurry by the addition thereto, in appropriate mixing equipment, of the aqueous recycled solution from the copper cementation stage of the process. The slurry will usually have an iron content of from 15 to 35 grams per liter due to iron in the recycled solution. It will also have a pH that is usually below 2 due to the acid formed when the aqueous solution is added to the flue dust and because of the acid in the recycled solution. Additional sulfuric acid may be added to the slurry, if necessary, to bring it to the desired level for satisfactory copper recovery.

The aqueous, acidic slurry is introduced into an autoclave. Leaching is carried out in the autoclave within the lower temperature end of the range previously mentioned herein for the prior art proposal, typically at about 140° C. (284° F.) and at a considerably lower oxygen overpressure than is within the range previously mentioned herein for the prior art proposed, typically at about 50 pounds per square inch. The resulting slurry is subjected to liquid-solids separation, usually by filtration, to separate the copper-bearing solution from residual solids, which include precious metal values along with arsenic, bismuth, lead, and antimony values in insoluble form. These are washed and passed to waste, e.g. to the usual tailings pond following recovery of the precious metals by conventional techniques. Because of their aqueous insolubility, there is no danger of harming the environment.

It is usually desirable, though not necessary, to pass the pregnant leach solution through a molybdenum recovery circuit (see Wells et al. U.S. Pat. No. 4,026,988), as indicated, for salvaging molybdenum values. In any event, it is passed to a conventional copper cementation stage, where the copper is precipitated on metallic iron. Surprisingly, despite the fact that the flue dust leach stage described above leaves a significant amount of the arsenic values, i.e. from about 0.5 to about 2.0 grams per liter and typically 1.0 gram per liter, in the leach solution subjected to cementation of copper on metallic iron for recovery of the copper values, there is substantially no evolution of highly toxic arsine gas during the cementation stage.

Some of the arsenic remaining in solution is precipitated with the copper in the cementation stage. Copper is generally precipitated first, however, so that the amount of arsenic precipitated with the copper can be held at a very low level by holding copper recovery in the cementation stage to about 95%. Overall copper recovery is not affected by this, since the solution is recycled.

Following separation of the liquid and solid phases, as by a conventional filtration step, the precipitate copper solids are preferably recycled to the smelter, while barren solution is recycled for use in slurrying the smelter flue dust and as a diluent for the copper-bearing solution sent to the cementation stage. It should be noted that this supplies iron values additional to those contained in the autoclave feed material, which is desirable.

It is usually advantageous to control impurity build-up in the solution and to recover zinc and cadmium values by establishing a quantitatively minor bleed stream of the barren solution and neutralizing such bleed stream by the addition of sodium carbonate or hydroxide thereto to precipitate zinc values as zinc hydroxide. The cadmium values come out with the zinc values. Following filtration, the liquid phase may be sent to waste or to a water treatment plant.

The total sulfuric acid content of the leach solution is determined by optimum recovery of copper values. With flue dust feed analyzing as above indicated, the leach solution will have a pH of about 2.0 without the addition of any acid and copper recovery will be within the range of about 80 to 87%. With the addition of sulfuric acid to bring sulfuric acid concentration to about 44 grams per liter (2.5 volume percent), about 93% of the copper is leached from the flue dust and about 4% of the arsenic values remain in the solution. With reduced concentration of acid, the arsenic in solution is only slightly decreased. If the concentration of acid is increased above 44 grams per liter, the copper extracted increases to some extent and the arsenic values remaining in solution go up very rapidly. For example, at an $H_2SO_4$ concentration of 130 grams per liter, about 35% of the arsenic values remain in the solution rather than being precipitated.

The temperature in the autoclave is not critical, since arsenic precipitation during the leaching of the copper depends upon both temperature and time. The presently preferred temperature is 140° C. over a time period of one hour. With the one hour leach time, as the temperature is reduced copper extraction is reduced only slightly, but the arsenic remaining in solution increases rapidly to about 20% at 100° C. Above 140° C., copper extraction is increased slightly but the arsenic in solution remains about constant. Therefore, the upper limit for temperature is a matter of economics, the consideration being cost of energy required to increase the temperature against the minor increases in copper extraction.

As previously indicated, temperature is related to time, so lower temperatures for longer times may be used. The preferred temperatures will depend upon the time available for each leaching cycle. Generally the leach time required for similar results will double for each 10° C. decrease in temperature. Therefore, approximately the same results are obtained with a four hour leach at 120° C., a two hour leach at 130° C., and the one hour leach at 140° C. The lower temperature limit thus depends on the time available for each leach cycle.

The oxygen overpressure is also noncritical. The preferred range is between 20 and 50 pounds per square inch. Copper extraction of 93% and arsenic in solution of 5% (about 1.5 grams per liter) remain approximately constant in this pressure range at a leaching time of one hour. When oxygen overpressure drops below 20 psi, copper extraction remain approximately constant, but the amount of arsenic in solution increases rapidly to about 20% arsenic at 5 psi overpressure with a leaching time of one hour. Thus, the upper limit is determined by economic considerations and the lower limit depends upon temperature and time.

A typical laboratory example is as follows:

EXAMPLE

A series of cyclic tests were made wherein, for each cycle, 250 grams of flue dust were leached in a 2 liter Parr autoclave at 140° C. and 50 psig oxygen pressure for one hour in 1 liter of solution. Copper was precipitated by cementation on scrap iron, and the solution after copper removal was recycled to the autoclave to leach a new sample of dust. Sulfuric acid concentration was adjusted in each cycle to 44 g/l in the solution fed to the autoclave. Iron concentration was not adjusted and was variably dependent upon the dilution of the leach solution. Results are shown in the Table.

Table

| | Copper and Arsenic Recovery From Flue Dust Sample in Cyclic Tests | | |
|---|---|---|---|
| Cycle No. | Fe Concentration to Leach g/l | Extraction, Percent | |
| | | Cu | As |
| 1 | 18.8 | 92.7 | 4.0 |
| 2 | 16.1 | 97.7 | 10.7 |
| 3 | 13.9 | 95.4 | 20.9 (iron inadvertently depleted) |
| 4 | 20.1 | 94.6 | −5.1 (iron replenished) |
| 5 | 22.0 | 91.2 | 2.7 |

For none of these cycles was there any evolution of arsine gas during the copper cementation step performed on the leach solution therefrom.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. In a process for the recovery of copper values from highly toxic, smelter flue dusts and/or refinery sludges containing arsenic values as at least part of the toxic constituents, which process includes the leaching of such a flue dust and/or sludge with sulfuric acid at elevated temperature and under a pressurized oxygen atmosphere for solubilizing copper values and rendering insoluble the highly toxic values, the improvement comprising conducting the leaching step under such conditions of sulfuric acid concentration, temperature, and pressure as will precipitate toxic constituents while leaving a relatively small but significant amount of arsenic solubilized in the resulting copper-pregnant leach solution; separating the liquid and solid phases from the leaching step; recovering copper values from the pregnant leach solution by cementation on metallic iron, there being substantially no evolution of arsine gas during the cementation step of the process; separating the solid and liquid phases of the copper cementation step; and recycling the barren leach solution from the cementation step to the aforesaid leaching step to supply solubilized iron values during leaching.

2. The improvement of claim 1, wherein the solids are recycled to the smelter; and a major portion of the barren leach solution is used to slurry the feed materials prior to the leaching step.

3. The improvement of claim 2, wherein the leached material also contains zinc values and a minor portion of the barren leach solution is treated for the recovery of the zinc values, the residual liquid not being returned to the processing circuit.

4. The improvement of claim 1, wherein the leached material also contains molybdenum values and the pregnant leach solution is treated for the recovery of molybdenum values prior to the copper cementation step.

5. The improvement of claim 1, wherein the leached material also contains one or more additional toxic values from the group consisting of bismuth, lead, antimony, and cadmium.

6. The improvement of claim 1, wherein the relatively small but significant amount of arsenic left in the copper-pregnant leach solution is within the range of about 0.5 to 2.0 grams per liter.

7. The improvement of claim 6, wherein the feed material contains about 13.5% copper and about 13.5% arsenic, and the sulfuric acid concentration is about 44 grams per liter.

8. The improvement of claim 1, wherein the relatively small but significant amount of arsenic left in the copper-pregnant leach solution is within the range of about 1.0 gram per liter.

9. The improvement of claim 1, wherein the feed material contains about 13.5% copper and about 13.5% arsenic, the relatively small but significant amount of arsenic left in the copper-pregnant leach solution is about 1.0 gram per liter, the sulfuric acid concentration is about 44 grams per liter, the temperature is about 140° Centigrade, the pressure is about 50 psi, and the leaching time is about one hour.

* * * * *